US006337972B1

(12) United States Patent
Jones et al.

(10) Patent No.: US 6,337,972 B1

(45) Date of Patent: Jan. 8, 2002

(54) MELODIC ALERTS FOR COMMUNICATIONS DEVICE

(75) Inventors: Richard H. Jones; David R. Tracey, both of Cambridge (GB); Ian Dod, Fremont, CA (US); Paul Simon Hardwick, Cambridge (GB)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/216,261

(22) Filed: Dec. 18, 1998

(30) Foreign Application Priority Data

Dec. 23, 1997 (GB) ............................................ 9727011

(51) Int. Cl.$^{7}$ ................................................ H04Q 3/02

(52) U.S. Cl. .................... 455/38.5; 455/567; 340/7.43; 340/7.57

(58) Field of Search .............................. 455/38.5, 38.2, 455/38.1, 414, 550, 575, 567; 340/825.44, 311.1, 825.48, 7.57, 7.62, 7.43, 7.44; 368/72; 84/609, 7.58; 453/401

(56) References Cited

U.S. PATENT DOCUMENTS

| | | | | | |
|---|---|---|---|---|---|
| 4,437,380 | A | * | 3/1984 | Yamaguchi | 84/609 |
| 4,519,044 | A | * | 5/1985 | Munetsugu | 708/134 |
| 4,622,879 | A | * | 11/1986 | Matsubara | 84/609 |
| 4,646,609 | A | * | 3/1987 | Teruo et al. | 84/615 |
| 4,699,518 | A | * | 10/1987 | Tanabe | 368/75 |
| 4,868,561 | A | * | 9/1989 | Davis | 340/825.44 |
| 5,546,077 | A | * | 8/1996 | Lipp et al. | 340/7.43 |
| 5,739,759 | A | * | 4/1998 | Nakazawa et al. | 340/825.44 |
| 5,757,277 | A | * | 5/1998 | Kobayashi | 340/825.22 |
| 5,802,467 | A | * | 9/1998 | Salazar et al. | 455/420 |
| 6,075,998 | A | * | 6/2000 | Morishima | 455/567 |

FOREIGN PATENT DOCUMENTS

| | | | | |
|---|---|---|---|---|
| EP | 0709812 A2 | | 1/1996 | G08B/3/10 |
| EP | 0709812 | * | 1/1996 | |
| WO | WO9203891 | | 3/1992 | |

* cited by examiner

*Primary Examiner*—Nay Maung
*Assistant Examiner*—Joy K. Contee
(74) *Attorney, Agent, or Firm*—Jack D. Slobod

(57) ABSTRACT

A point-to-point communications device (SS) which is capable of generating melodic alerts, each alert being generated using numeric data in a received message. The device includes a controller (36) programmed with an algorithm for dividing the digits in a decoded message into one or two digit fields. One digit fields are used respectively to determine the tempo (t) and the number of times (p) a sequence of notes is played and two digit fields are used to select notes.

6 Claims, 2 Drawing Sheets

MELODIC ALERTS FOR COMMUNICATIONS DEVICE

BACKGROUND OF THE INVENTION

The present invention relates to a communications device, particularly but not exclusively, to devices such as selective call receivers for example radio pagers, cellular or cordless telephones or corded telephones.

Such communications devices incorporate one or more alerting transducers which may be audible, visual or tactile. In the case of a radio pager, which can be less intrusive than cellular or cordless telephones, when a user has been alerted, he/she has no indication about the source or the perceived priority of a message. The only way of ascertaining this information is for the user to read the message which has been received.

Battery powered communications devices generally have LCD displays for displaying control and user interface data as well as messages. As is known LCD displays have a poor contrast which can make them difficult to read under poor lighting conditions, especially for visually impaired users.

Typically communications devices generate audible alerts such as sequences of tones and more recently melodies. In earlier devices such audible alerts were preprogrammed by the manufacturer which meant users of similar devices in a small working area may be confused as to whose device is generating an alert. More recently a range of different melodies have been pre-programmed into a communications device and a user manually selects one of the melodies in the range during the setting-up of the device's user interface.

WO 92/03891 discloses a selective call receiver in which a user can manually program his/her own melody note by note into the receiver. An LCD panel in the receiver displays the melody as it is being created. The creation of the melody may be done using 2 keys provided on the receiver or by an external programming computer. A problem with this approach is that entering melody data may be tedious, slow and error prone, especially for a visually impaired person, and is costly in terms of perceived product quality.

SUMMARY OF THE INVENTION

An object of the present invention is to facilitate the generation of a distinctive audible alerting signal in a communications device.

According to one aspect of the present invention there is provided a point-to-point communications device comprising receiving means for receiving a message, control means for determining if a received message is destined for the communications device and alerting means for producing an alerting signal, the alerting signal being determined from the received message.

According to another aspect of the present invention there is provided a method of generating a melody in a point-to-point communications device, comprising receiving and decoding a message, and generating a melody using decoded message data.

BRIEF DESCRIPTION OF THE DRAWINGS

The present invention will now be described, by way of example, with reference to the accompanying drawings, wherein.

DETAILED DESCRIPTION

Figure 1:
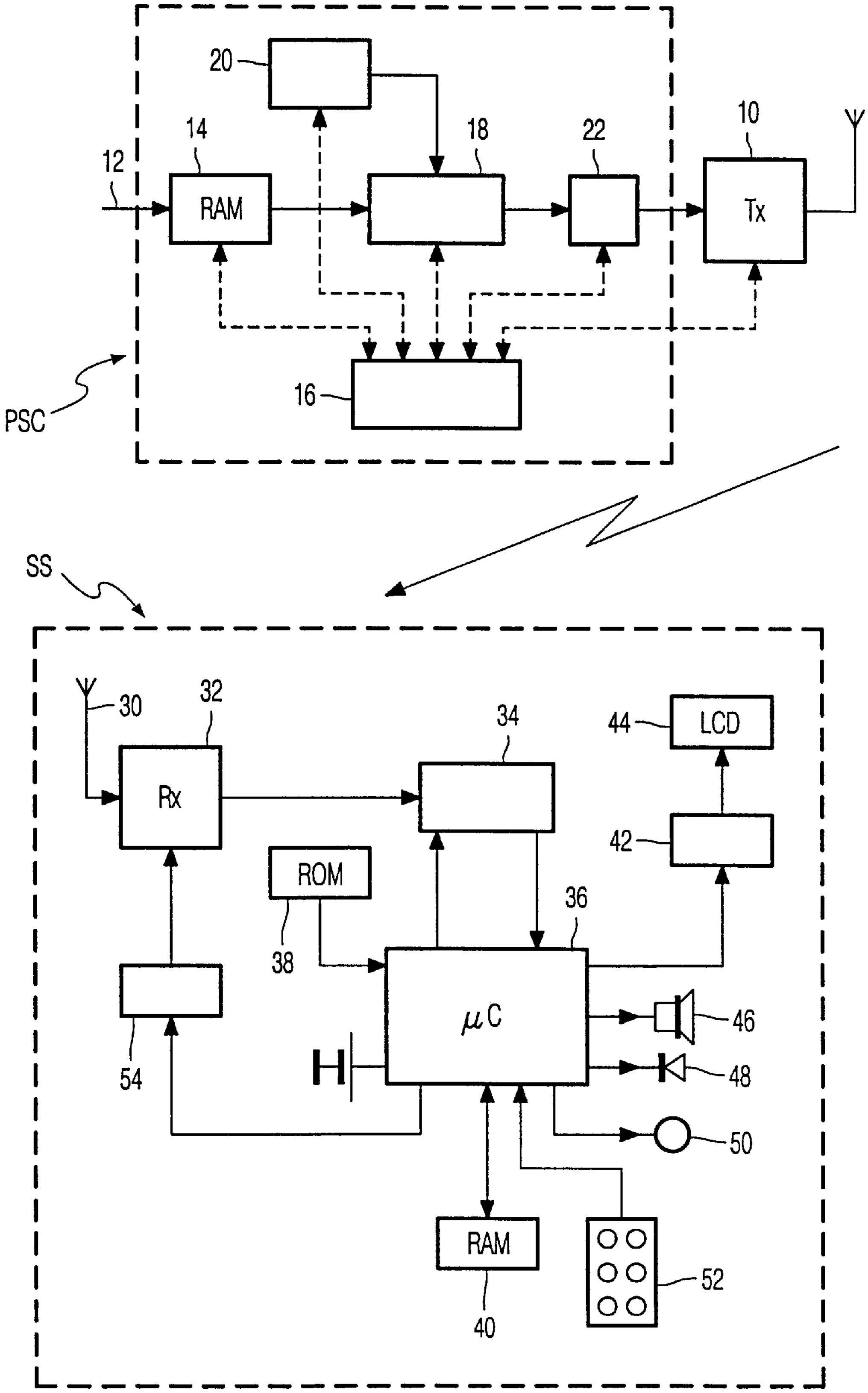
FIG. 1 is a block schematic diagram of a simplified one way paging system.

The simplified one-way paging system shown in FIG. 1 comprises a paging system controller PSC coupled to a base station (or primary station) transmitter 10. In reality there would be a plurality of geographically distributed base station transmitters coupled by landlines to the paging system controller PSC. The base station transmitters are frequently operated in a quasi-synchronous mode.

The paging system controller PSC comprises an input 12 for the receipt of paging messages which may have been supplied by an operator (not shown) or a user having a personal computer and a modem (not shown). The input 12 is coupled to a message store or RAM 14 which stores the messages until a large enough number of messages have been accumulated to justify their being transmitted in a burst or in the case of a quiet period the messages are transmitted periodically. A controller 16 is provided for controlling the operation of the paging system controller. Under the control of the controller 16 messages are formatted in a formatting stage 18. In formatting a message, an address code is appended to the front of the message by a Receiver Identity Code (RIC) being read out from a code store 20. The message is formatted to be able to be sent in accordance with a respective air interface protocol such as CCIR Radiopaging Code No. 1, alternatively known as POCSAG. The formatted message is encoded in a channel coding stage 22 and relayed to the transmitter 10 for onward transmission by radio to active, in-range secondary stations or pagers SS, of which one is shown in FIG. 1.

The pager SS comprises an antenna 30 coupled to a receiver 32 which is connected to a decoder 34. A control processor 36 is coupled to the decoder 34. The processor 36 operates in accordance with a program stored in a read-only memory 38. The processor also includes an address store (not shown) which contains the unique addresses of that pager. In the event of the pager receiving a message then this is stored in a non-volatile memory 40 for example an EEPROM. The messages can be displayed subsequently on a LCD panel 44 which has its associated driver 42 coupled to the control processor 36. Annunciating devices which may comprise an acoustic transducer 46, a light emitting transducer 48 and a vibrator 50 are coupled to the control processor 36. A keypad 52 provides a man machine interface whereby a user can instruct the processor to carry out various functions, for example to display a stored message on the panel 44. A receiver power control stage 54 is coupled between the processor 36 and the receiver 32 in order to practice battery conservation in accordance with the provisions of the paging protocol being followed.

If desired, some of the functional blocks, such as the decoder 34 and the receiver power control stage 54, may be implemented in the software for the processor 36.

The present invention relates to the alerting signal produced by the acoustic transducer 46 in response to receiving a message having an address corresponding to one of those stored in the address store (not shown). The preamble of this specification reviews different known methods by which alerting signals are selected. However in the case of melodic alerting signals, these are selected by the pager user from a plurality of sequences prestored in the pager by the manufacturer or generated note by note by the user. However once selected or generated the same melodic sequence is repeatedly played for each alert until the user makes a new selection or generates a new sequence. In contrast to these known techniques, a pager made in accordance with the present invention generates a melodic sequence from the content of a received message and in that respect the melodic sequence can be associated with the sender as typically in the case of a numeric message, the message is the telephone number of the user which is unique.

For convenience of description, the present invention will be described with respect to numeric paging messages which normally comprise a sequence of digits frequently representing a telephone number which the pager user is required to call. However the sequence of digits could represent a "canned message", that is a prestored alpha-numeric message which is recovered in response to a numeric message giving a memory location as two or more ASCII or hexadecimal characters. Voice mail could also be used.

In order to generate a melodic sequence it is necessary to determine tempo (t), that is speed of playing in beats per minute (bpm), the number of times that the melody is to be played (p), the notes and the note duration. The pager control processor 36 divides a received numeric message into a plurality of one digit and two digit fields. The one digit fields are used to indicate tempo, t, and the number of times, p, a melody is to be played and the two digit fields are used to indicate the notes.

Figure 2:
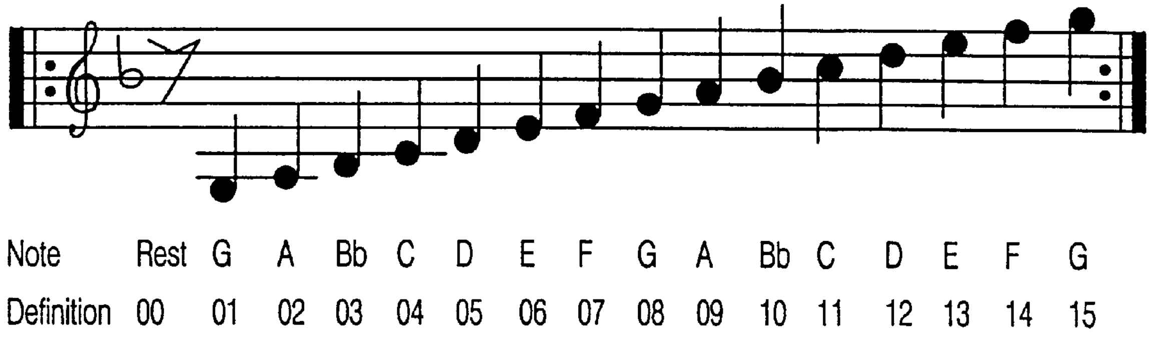
FIG. 2 illustrates the principle of generating melodies from an incoming numeric message.

FIG. 2 explains the principle and assumes a message length of up to 20 digits. FIG. 2 illustrates a stave and shows 2 octaves of notes. The first one digit field contains a digit having a value of between 1 and 9 which defines the tempo t in beats per minute (bpm) as shown in the following table:

| Definition | 1 | 2 | 3 | 4 | 5 or 0 | 6 | 7 | 8 | 9 |
|---|---|---|---|---|---|---|---|---|---|
| Tempo, t | 320 | 360 | 400 | 440 | 480 | 520 | 560 | 600 | 640 |

The second one digit field defines the number p, and needs to be between 5 and 9. In the event of the digit having a value of less than 5, then p has a default value of 5 as shown in the following table:

| Definition | 1 | 2 | 3 | 4 | 5 | 6 | 7 | 8 | 9 |
|---|---|---|---|---|---|---|---|---|---|
| No. of plays, p | 5 | 5 | 5 | 5 | 5 | 6 | 7 | 8 | 9 |

The concatenated two digit fields define the respective notes as shown in the following table:

| Definition | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| Note | Rest | G | A | Bb | C | D | E | F | G | A | Bb | C | D | E | F | G |

Other definitions 00 to indicate single beat duration rest, that is, increasing the length of the note by a beat.

16 to indicate double beat duration rest, that is, increasing the length of the note by two beats.

32 to indicate triple beat duration rest, that is, increasing the length of the note by three beats.

48 to indicate quadruple beat duration rest, that is, increasing the length of the note by four beats.

Figure 3:
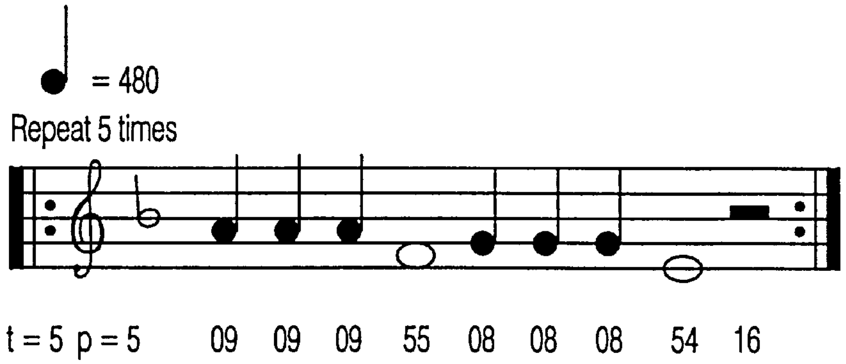
FIG. 3 illustrates an example of a generated melody.

FIG. 3 shows an application of this principle to the start of Beethoven's 5th which is defined by the numeric message: 55090909550808085416. Thus the first digit 5 means t=5, which corresponds to a tempo of 480 bpm, the second digit which is also a 5 means p=5 which corresponds to 5 repeats. The next three pairs of digits (09) correspond to three "A"s, the next pair 55 correspond to 4 counts of the note "F", the next three pairs of digits (08) correspond to three "G"s, the next pair 54 correspond to 4 counts of the note "E" and the last pair 16 correspond to a two count rest.

Having illustrated the principle of how a melody is generated using the numeric data in a message, an example of an algorithm will now be given. It will be assumed that the pager has a user interface displaying a number of menus in response to successive actuation of a menu key. At the Set Melody Screen, three distinct melody types are selectable.

1. Factory default melodies which are stored in melody numbers, say 1 to 9;
2. User programmed melodies, which are stored in melody numbers, say 10to 18;
3. Automatic Data Play (ADP) melodies, which is offered to the user with a separate prompt where for example number 19 would otherwise be displayed. In ADP melodies are generated from the numeric and/or alphanumeric data in incoming messages.

In the interests of brevity, factory default melodies and user programmed melodies will not be discussed as they form no part of the inventive step and also are known per se in the art.

Assuming a 20 digit numeric message:

| Numeric Message | 0 | 1 | 23 | 45 | 67 | 89 | 01 | 23 | 45 | 67 | 89 |
|---|---|---|---|---|---|---|---|---|---|---|---|
| Melody Representation | t | p | n1 | n2 | n3 | n4 | n5 | n6 | n7 | n8 | n9 |

The definition of the single digit fields for tempo t and plays p is as described above with reference to FIG. 2. The double digit fields n1 to n9 correspond to nine notes or rests with variable pitch and length.

The conversion is as follows:

| | |
|---|---|
| 00–15 | notes of pitch: rest, s__ to s^, with length one beat, where s__ indicates a lower octave and s^ indicates a higher octave; |
| 16–31 | notes of pitch: rest, s__ to s^, with length two beats; |
| 32–47 | notes of pitch: rest, s__ to s^, with length three beats; |
| 48–63 | notes of pitch: rest, s__ to s^, with length four beats; |
| 64–79 | map to 00–15; |
| 80–95 | map to 16–31; |
| 96–99 | map to 32–35; |

The examples shown assume a tonic "C".

As mentioned above, 00, 16, 32, and 48 are rests of duration one to four beats, respectively.

In formatting messages in the paging system controller PSC (FIG. 1) a number of special cases arise and are dealt with as follows:

1. Special formatting characters including spaces (message nibble values over 9), are ignored.
2. Messages shorter than 20 digits will play fewer notes.
3. If there is an odd number of digits, the last digit is prefixed with 0 to provide a pair of numbers for the last note, e.g. 1234567 is pre-converted to 12 34 56 07.
4. A message containing less than three digits is treated as a tone-only call for melody purposes as there is no note information in it.
5. Messages which consist only of rests default to playing a factory default melody.
6. If tone-only calls are played, or alerted in ADP mode then, as there is no note data, the source address value is used to index to a melody number in the pager. For example a tone-only call on source address 1 causes factory default melody 1 to be played.
7. Tone-only calls cannot be stored as User programmed melodies.
8. Messages containing data which is errored are played as defined above. Note that this may mean the melody is different from the "correct" melody. The "most significant" digits, i.e. those that represent the tempo and number of plays, are the least likely to be corrupted.

The conversion algorithm has the following properties:

1. The algorithm allows flexible generation of user programmed melodies, while also supporting ADP mode, which requires a repeatable, non-dissonant and reasonably unique melody to be generated from any telephone number.
2. The pitch range allows fifteen separate pitches essentially in one key, and spanning two octaves.
3. {tonic}, the absolute pitch start point, is fixed to suit the range of the speaker.
4. Notes may have one of four durations.
5. The allowed tempo range is narrowed to ensure quality of ADP call alerts.
6. The tempo is constant through the generated melody.
7. The minimum number of plays is 5. This ensures that generated melodies are sufficiently long to alert the user to a new message.
8. Note values greater than 63 will occur either as a result of erroneous melody construction by the user, or due to normal message data in ADP mode. All note values are modulo 64 ensuring that all values are transformed into a meaningful note.

In ADP mode, any incoming message is alerted by converting and then playing its message data as a melody call alert. The incoming message may be numeric or alphanumeric. This feature allows the pager to be used by visually impaired users who may learn to recognise the melodies generated by frequently received telephone numbers.

For urgent messages, these may be indicated by the message causing a change in the melodic alert generated by that message or by arranging for all messages received on a given address being treated as urgent.

Normally the pager does not support automatic storage of melodies generated in ADP mode, because a melody can be generated from the numeric data as received.

Although the present invention has been described with reference to a one-way digital paging system, the present invention may be used in a two-way paging system, a cellular or cordless telephone system and any other suitable communication systems. Further although the present invention has been described with reference to numeric messages, alpha-numeric messages may also be used to generate melodic alerting signals.

From reading the present disclosure, other modifications will be apparent to persons skilled in the art. Such modifications may involve other features which are already known in the design, manufacture and use of communication systems or component parts thereof and which may be used instead of or in addition to features already described herein.

What is claimed is:

1. A point-to-point communications device comprising receiving means for receiving a message, control means for determining if a received message is destined for the communications device and alerting means for producing an alerting signal, the alerting signal being determined from the received message, wherein the control means divides the received message into a plurality of predesignated fields, one of which fields is used by the control means to determine tempo and other of said fields are used by the control means to determine notes, and wherein each note is represented by a double character field and in that the control means in response to ascertaining that there is an odd number of characters in the message adds a character to a predetermined single character to provide a double character field representative of a note.

2. A communications device as claimed in claim 1, characterised in that the alerting signal is an audible melodic signal.

3. A communications device as claimed in claim 2, characterised in that the audible melodic signal is derived from a numeric message received by the receiving means.

4. A communications device as claimed in claim 3, characterised in that the control means divides the received message into a plurality of predesignated fields, one of which fields is used by the control means to determine tempo, another of which fields is used by the control means to determine the number of plays of the melodic signal and further ones of said fields are used by the control means to determine notes.

5. A method of generating a melody in a point-to-point communications device, comprising receiving and decoding a message, and generating a melody using decoded message data, wherein the decoded message is divided into a plurality of predesignated fields, one of which fields is used to determine tempo and other of said fields are used to determine notes, and wherein a note is represented by a double character field and in that in response to ascertaining that there is an odd number of characters, a predetermined character is added to a predetermined single character to provide a double character representative of a note.

6. A method as claimed in claim 5, characterised by dividing the decoded message data into a plurality of predesignated fields, one of which fields is used to determine tempo, another of which fields is used to determine the number of plays of the melody signal and further ones of said fields are used to determine notes.

* * * * *